United States Patent [19]
Bandyopadhyay

[11] Patent Number: 6,135,043
[45] Date of Patent: Oct. 24, 2000

[54] SILICON MEMS-BASED POLYMER EJECTOR FOR DRAG REDUCTION OF UNDERSEA VEHICLES

[75] Inventor: Promode R. Bandyopadhyay, Barrington, R.I.

[73] Assignee: The United States of America as represented by the Secretary of the Navy, Washington, D.C.

[21] Appl. No.: 09/379,828

[22] Filed: Aug. 24, 1999

[51] Int. Cl.$^7$ .................................................. B63B 1/34
[52] U.S. Cl. ...................................... 114/67 R; 114/67 A
[58] Field of Search ............................... 114/67 R, 67 A

[56] References Cited

U.S. PATENT DOCUMENTS

| | | | |
|---|---|---|---|
| 3,435,796 | 4/1969 | Merrill | 114/67 R |
| 3,732,839 | 5/1973 | Schuster et al. | 114/67 R |
| 5,346,745 | 9/1994 | Bandyopadhyay | 428/156 |
| 5,758,823 | 6/1998 | Glezer et al. | 239/4 |

*Primary Examiner*—Stephen Avila
*Attorney, Agent, or Firm*—Michael J. McGowan; Prithvi C. Lall; Michael F. Oglo

[57] ABSTRACT

A polymer ejector system for reducing drag on an external surface of an underwater vessel includes a base portion mounted in an exterior surface of the underwater vessel, the base portion including an arcuate inner wall. A flexible lip portion is positioned above the base portion and spaced apart therefrom. The lip portion has an outer surface substantially coplanar with an outer surface of the underwater vessel, an arcuate inner wall, and is tapered at a distal end of the lip. This lip may be actively moved by means of MEMS deposited electrodes to control the passageway mentioned next. A passageway is formed between and defined by the inner wall of the lip and the inner wall of the base portion, such that the passageway terminates at the outer surface of the underwater vessel and substantially tangent thereto. The ejector may be constructed from single crystal silicon by so called MEMS (Micro-Electro-Mechanical Systems) methods.

14 Claims, 3 Drawing Sheets

6,135,043

SILICON MEMS-BASED POLYMER EJECTOR FOR DRAG REDUCTION OF UNDERSEA VEHICLES

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

This invention generally relates to a selective ejection of a polymer phase-matched to structure passage. More particularly, the invention relates to the selective ejection of the polymer phase-matched material such that the ejected polymer evenly coats an exterior of an underwater vessel, resulting in effective drag reduction.

(2) Description of the Prior Art

The current art for drag reduction by means of polymer injection or ejection is a well proven technique of drag reduction. It depends on the so called Tom's phenomena. Many laboratory and field tests have repeatedly shown that the technique works and significant drag reduction and noise reduction can be achieved in seawater. However, enabling technologies are needed before the polymer method can be installed in Naval vehicles. It is necessary to devise mounting and deployment of the polymer such that very little polymer needs to be carried on board for on-demand use. Further, the ejection needs to be minimal and should be carried out quietly. The present invention is an enabling technology that addresses these needs in the art, and particularly the needs of the Navy, of minimal, quiet, and on-demand ejection. Continuing research and development over many years has improved the performance of underwater vehicles greatly. This includes both the hydrodynamics and noise characteristics. However, there is a need for technologies that will lead to a substantial drag reduction. There is a need to develop such new technologies to stay ahead. Drag reduction will lead to a greater range, higher payload, more endurance, a quieter vehicle and similar hydrodynamic advantages.

Thus, a problem exists in the art whereby there is a need for further drag reduction on underwater vehicles, by means of polymer injection or ejection, which is effective and easy to use.

The following patents: U.S. Pat. No. 5,346,745 to Bandyopadhyay and U.S. Pat. No. 5,758,823 to Glezer et al. for example, disclose various types of polymer drag reduction, but do not disclose a polymer drag reduction apparatus in which various types of surface ejection are suggested. Reference is also made to Bandyopadhyay, P. R. 1995 Microfabricated Silicon Surfaces for Turbulence Diagnostics and Control, Proceedings of ACTIVE 95, the 1995 International Symposium on Active Control of sound and Vibration, pp. 1327–1338, and Bandyopadhyay, P. R. 1995 Elastic Microfabricated Surface for Turbulence Control, NUWC IR Annual Report (pp. 9.1–9.7).

Specifically, the patent to Bandyopadhyay discloses a surface for use in connection with an object in relative motion through a fluid medium including a plurality of surface elements arranged in rows on the surface, with surface elements of each row being arranged generally orthogonal to the direction of relative motion of the object in a medium. Each surface element includes means defining a cavity, the means including a bottom surface layer, sidewalls, and an upper lip supported along an upstream edge in a cantilevered manner and extending in a downstream direction over the cavity to define a gap permitting fluid communication between the medium and the cavity. The lip is flexible so as to facilitate deflection in response to differentials between pressure inside the cavity and outside the cavity. The cavities of the surface elements in each row are interconnected by means of passageways to thereby facilitate fluid communication therebetween. It is believed that, in the surface layer, in response to local variations in pressure of the medium over surface elements in a row, due to the passage for vortices overhead, the lips of the surface elements deflect to permit equalization of fluid pressure between the medium proximate the surface elements and the respective cavity. The passageways interconnecting the cavities of the surface elements facilitate equalization of pressure between cavities of surface elements in each row, thereby reducing pressure variations, and thereby also reducing turbulence of the medium around the object.

The patent to Glezer et al. disclose a synthetic jet actuator, which can be micro-machined if desired. The jet actuator generates a synthetic jet stream characterized by as series of successive vortices that can be used for effectively entraining adjacent fluid. The synthetic jet actuator can be used to bend, or vector, a jet stream from another jet actuator. Further, because the synthetic jet actuator exhibits zero net mass flux, it can be used within a bounded volume. In structure, the synthetic jet actuator comprises a housing defining an internal chamber and having an orifice. A flexible metallized diaphragm forms a wall of the housing which can change the volume of the chamber when moved. An electrode is disposed adjacent to and spaced from the diaphragm and an electrical bias is imposed between the metallized diaphragm and the electrode by a control system to force movement of the diaphragm. As the diaphragm moves, the volume in the internal chamber changes and vortices are ejected from the chamber through the orifice.

It should be understood that the present invention would in fact enhance the functionality of the above patents by providing an ejector which may be used as either an active or a passive ejector, taken alone, in a sequential series, or as an array, to effectively maintain a reduced friction on the surface of a vessel.

SUMMARY OF THE INVENTION

Therefore it is an object of this invention to provide an ejector of a particular design for ejecting a polymer fluid.

Another object of this invention is to provide a passive ejector of a particular design for ejecting a polymer fluid over a vehicle surface.

Still another object of this invention is to provide an active ejector of a particular design for ejecting a polymer fluid over a vehicle surface.

A still further object of the invention is to provide an ejector which may function as either an active or a passive ejector and which is easily adaptable to function singly, in series, or as an array.

Yet another object of this invention is to provide an ejector which is simple to manufacture and easy to use.

In accordance with one aspect of this invention, there is provided a polymer ejector system for reducing drag on an external surface of an underwater vessel includes a base portion mounted in an exterior surface of the underwater vessel, the base portion including an arcuate inner wall. A flexible lip portion is positioned above the base portion and spaced apart therefrom. The lip portion has an outer surface substantially coplanar with an outer surface of the underwater vessel, an arcuate inner wall, and is tapered at a distal end of the lip. This lip may be actively moved by means of MEMS deposited electrodes to control the passageway mentioned next. A passageway is formed between and defined by the inner wall of the lip and the inner wall of the base portion, such that the passageway terminates at the outer surface of the underwater vessel and substantially tangent thereto. The ejector may be constructed from single crystal silicon by so called MEMS (Micro-Electro-Mechanical Systems) methods.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF THE PREFERRED EMBODIMENT

In general, the present invention is directed to an ejector for drag reduction of undersea vehicles. Further, the present invention is directed to a silicon MEMS-based polymer ejector for drag reduction of undersea vehicles.

The present invention has a number of features that lead to savings in polymer consumption. The basic invention from which modifications can be made is shown in FIG. 1 which is essentially a schematic of a passive polymer ejector 10 etched out of a single crystal silicon wafer.

Figure 1:
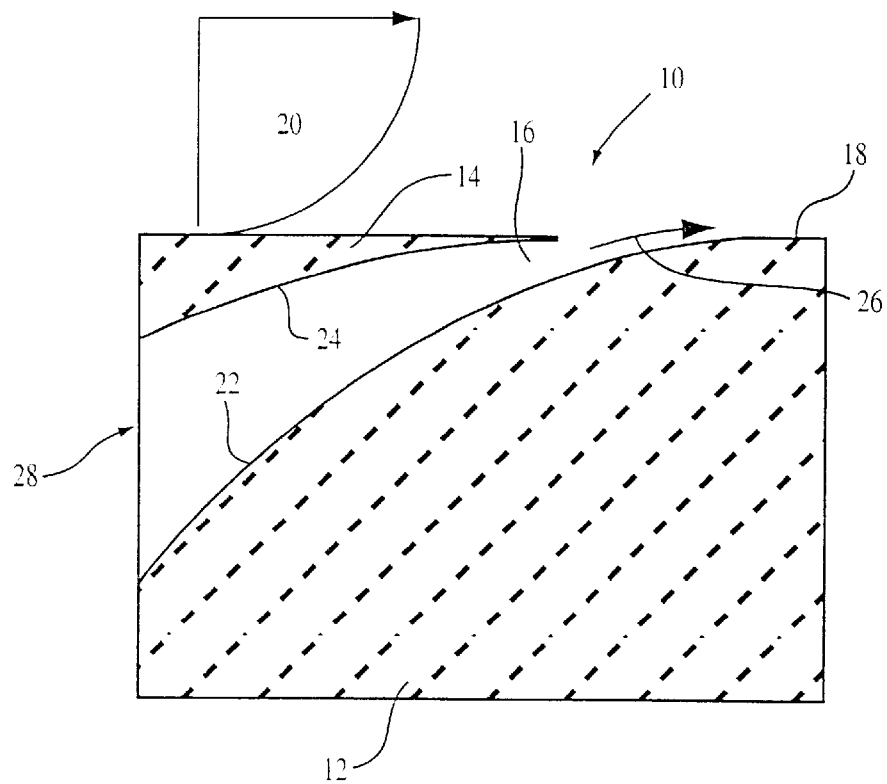
FIG. 1 is a schematic view of a first preferred embodiment of an ejector of the present invention having a passive ejection capability.
Figure 2:
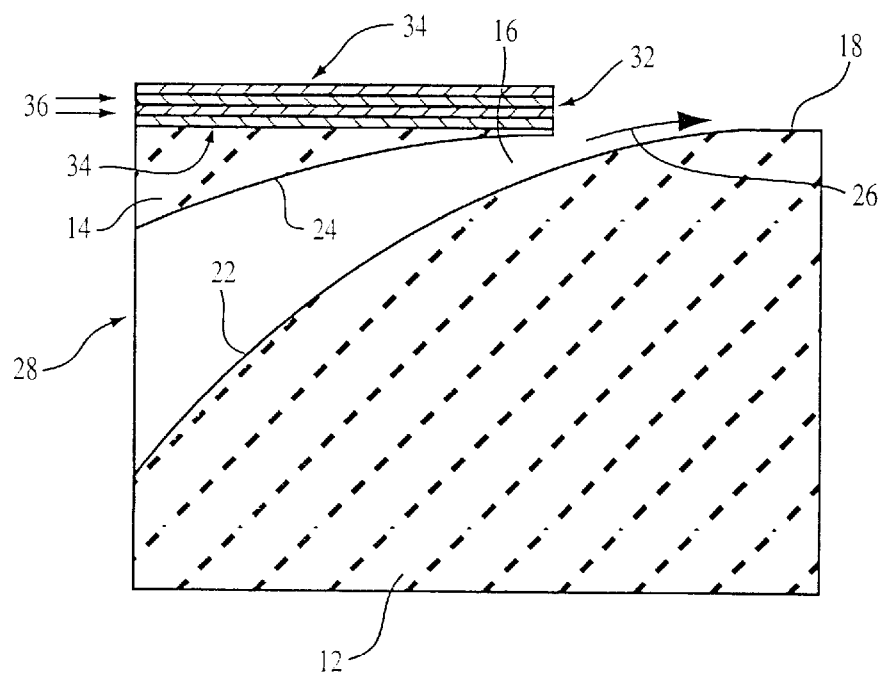
FIG. 2 is a schematic view of the first preferred embodiment of the invention having an active ejection capability.

More specifically, the passive ejector 10 includes a single crystal silicon block 12 having an external lip member 14, and a spacing between the block 12 and the lip 14 defining a gap 16 as shown in FIGS. 1 and 2. The lip 14 is flexible in nature due to its taper at an end terminating over the gap 16. The gap 16 is narrowest at an exterior surface 18 of an underwater vessel (not shown), the exterior surface 18 being in fluid contact with sea water 20 through which the vessel moves. Further, prior to the terminating portion of the gap 16 is an expanded silicone injection area, defined by inner guide wall 22 and outer guide wall 24. The guide walls 22 and 24 gradually narrow to terminate in the gap 16 adjacent the external vessel surface as described. As shown, a polymer liquid 28, such as silicone, is ejected into the passage defined by inner guide wall 22 and outer guide wall 24, the polymer liquid 28 being ejected to the external surface 18 of the vessel at the gap 16. The gap 16 may be only 5–10–100 $\mu$m wide which is easily achievable by MEMS fabrication techniques. Immediately behind the gap 16 in the fluid flow direction, is a turbulent boundary layer 26. The turbulent boundary layer 26 exists due to the opening necessary to eject the polymer onto the surface 18 of the vehicle. In order to counteract the turbulence existing at the turbulent boundary layer 26, the inner guide wall 22 and the outer guide wall 24 are shaped to permit a tangential ejection of the polymer 28 into the turbulent boundary layer and onto the surface layer 18 of the vessel.

FIG. 2 is a schematic diagram showing a modification to the ejector system of FIG. 1 and utilizing an active ejector. More specifically, a MEMS (Microelectro Mechanical Systems) technology is used to fabricate and activate the elastic lip 14. The schematic of FIG. 2 is not to scale and the vertical direction is highly exaggerated.

The lip 14 has a opposing piezo-resistive layers 32 surrounding a stack of electrodes 34. The piezo-resistive layers 32 and electrode 34 combination is seated on an external surface of the lip portion 14 in proximity to the terminal end of the lip 14 and the gap 16. By moving the lip 14, the opening size of the gap 16 may be controlled. More specifically, the gap 16 may be completely closed to obtain a virtually smooth wall surface 18 that is not achievable within a micron level precision in conventionally machined ejectors.

The electrodes 34 and piezo-resistive layers 32 permit the use of the lip 14 both as a sensor and as an actuator by sensing the size of the gap 16 and by actuating the lip 14 to thereby close the gap 16. This part of the invention allows digital control of polymer ejection which is an unprecedented capability, thereby opening up the possibility of vortex-structure-phase matched ejection shown in FIGS. 6 and 7 for further saving in polymer consumption.

Additional options for the schematic structure shown in FIG. 2 includes the introduction of silicon dioxide layers 36 acting as an air insulator between the outer piezo-resistive layers 32 and the electrode layers 34. The silicon dioxide layer 36 is optional.

Figure 3:
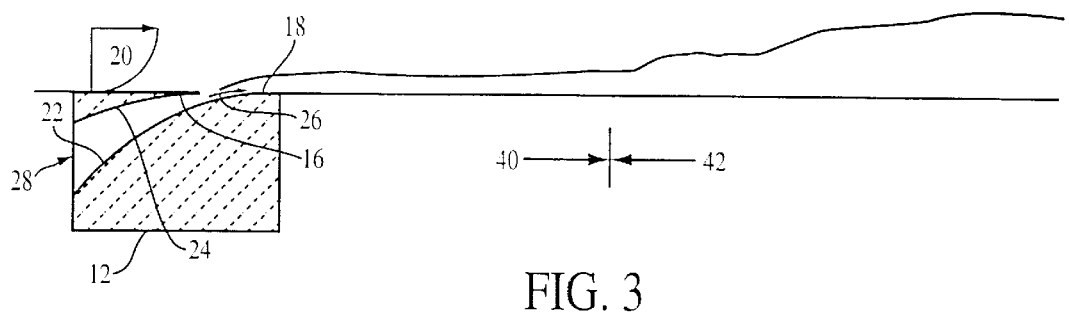
FIG. 3 is a side schematic view of the first preferred embodiment of the present invention showing a single ejected polymer layer over a vehicle surface.
Figure 4:
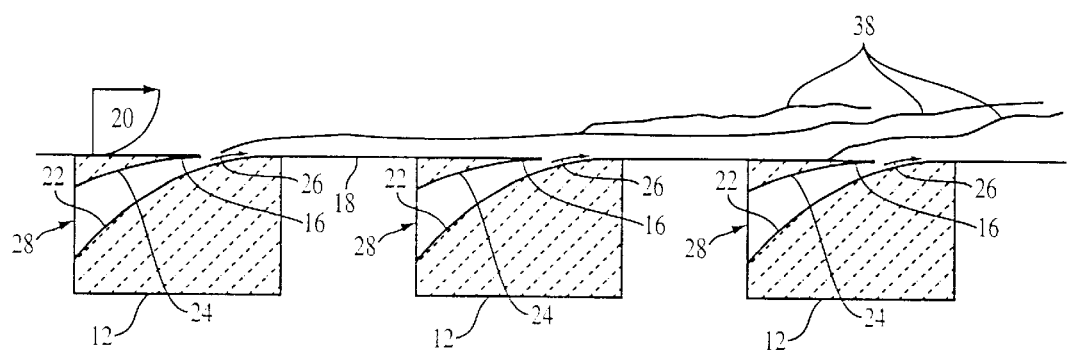
FIG. 4 is a side schematic view of the first preferred embodiment of the present invention showing plural ejected polymer layers over a vehicle surface.

FIGS. 3 and 4 depict a single and periodic polymer ejection, using the injectors of FIGS. 1 and 2, respectively.

In FIG. 3, a large amount of polymer 28 is ejected over the spanwise slot 16 a single time. However, in FIG. 4, a smaller amount of polymer 28 is ejected repeatedly from spatially displaced ejectors 10. By way of further explanation, the diagram of FIG. 3 shows the resulting elongated polymer flow over the surface 18 of the vessel with element 38 identifying the outer edge of diffusion of the polymer layer. Taking the illustration a step further, the arrow 40 depicts the distance over which the polymer 28 maintains a high concentration and thereby an axial zone in which an immediate high skin friction reduction on the vessel surface 18 is felt. The arrow 42 depicts the diffusion of the polymer 28 and defines an axial zone where the concentration of polymer 28 is weak and skin friction is greater than that at 40 over the surface 18 of the vessel.

Turning now to FIG. 4, there is illustrated the even further improvement over the ejection shown in FIG. 3 whereby the positioning of multiple and spaced ejectors 10 enables a continuous low friction polymer 28 to be maintained at the skin surface 18 of the vessel. It should be noted that the ejectors 10 are spaced such that the polymer 28 is re-ejected just before its near-wall concentration is diluted significantly.

Figure 5:
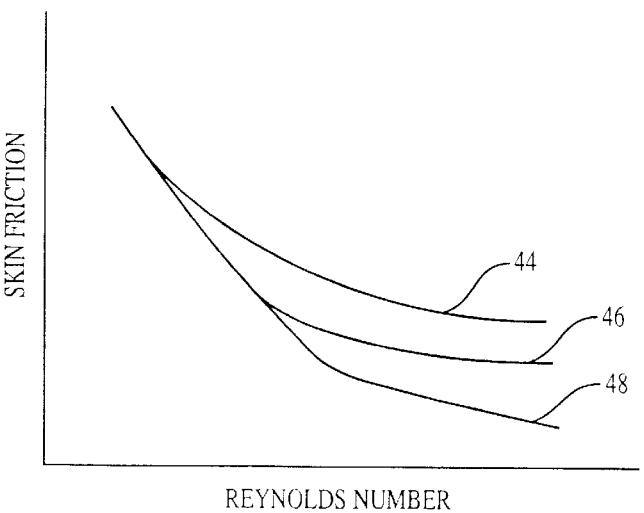
FIG. 5 is a graph of a stream-wise distribution of skin friction.

FIG. 5 depicts the effect of the use of single or multiple ejectors 10 on skin friction. FIG. 3 shows that polymer diffuses downstream of the initial ejection, and it becomes too diluted as one moves too far downstream of the ejector. The axial skin friction (friction at the vessel surface 18) distribution for a normal vehicle without any polymer ejection (similar to a smooth flat plate distribution or a rough wall distribution) is shown at 44 in FIG. 5. The skin friction which occurs as a result of a single ejection type described in connection with FIG. 3 is given by the distribution line 46 which is lower than that of a normal distribution line shown by 44. Still further, as FIG. 4 depicts, there is always a higher concentration of polymer 28 near the vessel wall surface 18 when spatially and periodic or repeated ejection is used. This results in an even further and enhanced lowering of skin friction, as depicted by distribution line 48 in FIG. 5. This enhanced skin friction reduction is simply due to the positioning of multiple ejectors 10 and thereby repeated ejection of polymer 28 to maintain a higher concentration of polymer 28 near the wall surface 18 where the turbulence production takes place.

Figure 6:
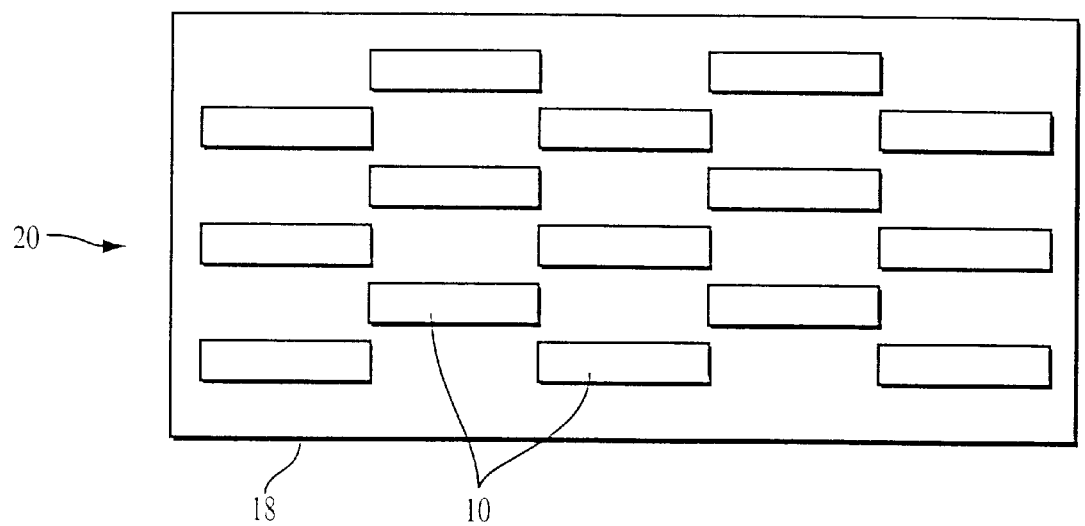
FIG. 6 is a top plan view of a plurality of ejectors positioned in a vessel surface.
Figure 7:
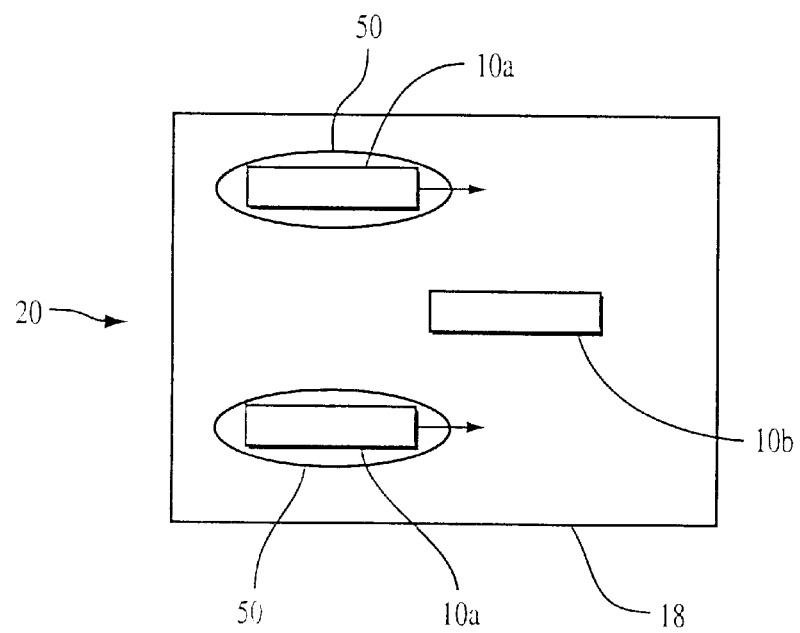
FIG. 7 is a top plan view of a plurality of ejectors illustrating selective ejection.

Turning now to FIGS. 6 and 7, there is a schematic illustration of a stream-wise distribution of ejectors 10 which will further enhance the reduction of skin friction. Referring first to FIG. 6, there is shown a schematic top plan view of a vehicle outer surface showing staggered arrays of polymer ejectors 10. The spacing of the ejectors 10 follow the so called wall layer scaling of turbulence production. Similar to the description in connection with the prior figures, the outer surface layer is shown at 18, the ejectors are shown at 10, and the flow direction of the sea water is shown at 20.

FIG. 7 provides further specific explanation with regard to the selective functioning of the ejectors 10. In particular, the illustration in FIG. 6 takes advantage of the near-wall vortex structure phase-matched ejection of polymer which takes advantage of the active ejector shown in FIG. 2. This implements the digital amenability of the MEMS based ejector. In FIGS. 6 and 7, the ejectors 10 are individually and relatively scaled and scattered in a way that mimics the statistical turbulence production events in a turbulent boundary layer. The ejection can also have a closed loop control. A skin friction or a pressure sensor (not shown) can be used to sense the arrival of the structures called near-wall vortex structures 50 in FIG. 7. The ejection of polymer can then be phased to the arrival of these structures. Such selective ON/OFF ejection will lead to some saving in polymer consumption. For example, in FIG. 7, the ejectors 10a will be in a polymer ejection ON mode, while ejectors 10b will be in a polymer ejection OFF mode. The ejectors 10a may also be in a polymer ejection ON mode due to the presence of near wall vortex structures 50.

The advantages and new features of the ejectors as shown and described provide a digital feedback control of polymer ejection which is unprecedented. Further, micron level dimensional precision and mirror-like surface finish allowing very high Reynolds number applications where most machined surfaces are deemed rough. A high quality finish is achieved for a low cost, making the ejectors amenable to batch processing. The active on-demand nature of the ejectors is not possible in any other contemporary approach. The masked ejector lip 14, when not used in an on-demand manner, still reduces friction on the surface of the vessel. It is now possible to achieve precision control of both the ejection volume rate and velocity. Further, the ejection may be phase matched to coincide with turbulent boundary layer vortex structures, allowing for further saving in polymer consumption. It is now possible to obtain span-wise and non-uniform ejection. Further, repeated application with stream-wise separation is now feasible allowing further saving in polymer consumption. A reduction of radiated noise is achieved and the device may be integrated with MEMS (Micro Electro Mechanical Systems) based sensor and actuator technologies allowing manipulation of ejection related hydrodynamics and electromagnetic control of polymer molecules. Finally, the device is lightweight and has a rugged construction.

An alternative version of this invention would be to use single crystals other than silicon. The invention applies equally to other alternatives including passive versions, rather than active versions. The ejector also applies to the ejection of substances other than polymer. For example, micro-bubbles, extremely fine micro-bubbles, any mucus, electrolytes for electromagnetic drag reduction where the Lorentz force may be kept highly focused near the wall, can be carried out by this invention. The invention can also be used for injection of any surfactants for drag reduction of Naval vehicles. This may be combined with other techniques of drag reduction like riblets, curvatures, body shaping, or heating and so on. It also applies to the techniques of viscous drag reduction via any kind of mass injection, for example in aircraft, spacecraft or rockets. The invention can also be used for injecting alcohol or any other detergent for cleaning the leading edge of aircraft wings from ice, insect, or sand debris. Accordingly, it is anticipated that the invention herein will have far reaching applications other than those of underwater vehicles.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed is:

1. An ejector for a vessel, said ejector comprising:
    a base portion mounted in an exterior surface of said vessel, said base portion including an arcuate inner wall;
    a flexible lip portion positioned above said base portion and spaced apart therefrom, said lip portion having an outer surface substantially coplanar with an outer surface of said vessel, an arcuate inner wall, and tapered at a distal end of said lip; and
    a passageway formed between and defined by the inner wall of said lip and the inner wall of said base portion; said passageway terminating at the outer surface of said underwater vessel and substantially tangent thereto.

2. The ejector of claim 1 further comprising a piezoelectric layer formed on the outer surface of said lip, and stacked electrodes positioned between said piezo-electric layer.

3. The ejector of claim 2 further comprising silicon dioxide layers formed intermediate each of the piezo-electric and electrode layers.

4. The ejector of claim 1 wherein said base portion and said lip are formed of a crystal silicon wafer.

5. The ejector of claim 4 wherein said crystal silicon wafer is a single wafer.

6. A polymer ejector system for reducing drag on an external surface of an underwater vessel, comprising:
    a base portion mounted in an exterior surface of said underwater vessel, said base portion including an arcuate inner wall;
    a flexible lip portion positioned above said base portion and spaced apart therefrom, said lip portion having an outer surface substantially coplanar with an outer surface of said underwater vessel, an arcuate inner wall, and tapered at a distal end of said lip; and a passageway formed between and defined by the inner wall of said lip and the inner wall of said base portion; said passageway terminating at the outer surface of said underwater vessel and substantially tangent thereto.

7. The ejector system of claim 6 further comprising a piezo-electric layer formed on the outer surface of said lip, and stacked electrodes positioned between said piezo-electric layer.

8. The ejector system of claim 7 further comprising silicon dioxide layers formed intermediate each of the piezo-electric and electrode layers.

9. The ejector system of claim 6 wherein said base portion and said lip are formed of a crystal silicon wafer.

10. The ejector system of claim 9 wherein said crystal silicon wafer is a single wafer.

11. The ejector system according to claim 6 wherein a plurality of ejectors are positioned in the outer surface of said underwater vessel.

12. The ejector system according to claim 11 wherein said plurality of ejectors are positioned in an array.

13. The ejector system according to claim 11 wherein said plurality of ejectors are linearly positioned in the external surface of said underwater vessel.

14. The ejector system according to claim 11 wherein said plurality of ejectors are spaced and actively operated as per turbulence production statistics.

* * * * *